(12) United States Patent
Mabashi et al.

(10) Patent No.: US 9,371,021 B2
(45) Date of Patent: Jun. 21, 2016

(54) DOUBLE-FOLDING-TYPE AUTOMOTIVE SEAT WITH HEADREST

(71) Applicants: Mitsubishi Jidosha Kogyo Kabushiki Kaisha, Tokyo (JP); TACHI-S CO., LTD., Tokyo (JP)

(72) Inventors: Yohei Mabashi, Tokyo (JP); Yoshiyuki Shimomura, Tokyo (JP); Shigeya Fujino, Tokyo (JP); Makoto Miyabata, Tokyo (JP); Toshiki Igarashi, Tokyo (JP)

(73) Assignees: MITSUBISHI JIDOSHA KOGYO KABUSHIKI KAISHA, Tokyo (JP); TACHI-S CO., LTD., Tokyo (JP)

( * ) Notice: Subject to any disclaimer, the term of this patent is extended or adjusted under 35 U.S.C. 154(b) by 0 days.

(21) Appl. No.: 14/436,422

(22) PCT Filed: Oct. 22, 2013

(86) PCT No.: PCT/JP2013/078559
§ 371 (c)(1),
(2) Date: Apr. 16, 2015

(87) PCT Pub. No.: WO2014/065272
PCT Pub. Date: May 1, 2014

(65) Prior Publication Data
US 2015/0258922 A1  Sep. 17, 2015

(30) Foreign Application Priority Data
Oct. 25, 2012  (JP) .................................. 2012-235298

(51) Int. Cl.
*B60N 2/48*  (2006.01)
*B60N 2/00*  (2006.01)
(Continued)

(52) U.S. Cl.
CPC  *B60N 2/305* (2013.01); *B60N 2/20* (2013.01); *B60N 2/206* (2013.01); *B60N 2/3013* (2013.01); *B60N 2/36* (2013.01); *B60N 2/48* (2013.01); *B60N 2/4879* (2013.01)

(58) Field of Classification Search
CPC .. B60N 2/305; B60N 2/01583; B60N 2/3013; B60N 2/4879; B60N 2/20; B60N 2/48; B60N 2/36; B60N 2/206
USPC ................................ 297/391, 397, 378.1, 336
See application file for complete search history.

(56) References Cited

U.S. PATENT DOCUMENTS 4,376,552 A * 3/1983 Pilhall .................. B60N 2/3013
  296/69
5,551,750 A * 9/1996 Yoshimura ............. B60N 2/286
  297/118
(Continued)

FOREIGN PATENT DOCUMENTS

JP      1-70638 U      5/1989
JP      2002-193011 A  7/2002
(Continued)

*Primary Examiner* — Milton Nelson, Jr.
(74) *Attorney, Agent, or Firm* — Birch, Stewart, Kolasch & Birch, LLP (57) ABSTRACT

A double-folding-type automotive seat including: a seat cushion having a forward end portion rotatably mounted on a floor of the automobile and an engagement piece provided to a rear end portion of the seat cushion, the engagement piece being normally disposed near to the floor of the automobile and displaceable with the seat cushion; a seat back having a lower end portion rotatably mounted on the floor of the automobile; and a headrest detachably mounted on a top portion of said seat back. In that seat, at a bottom surface of the headrest, there is provided a headrest attaching portion so configured to permit insertion therein of the aforesaid engagement piece of the seat cushion.

10 Claims, 6 Drawing Sheets

(51) Int. Cl.
  *B60N 2/30* (2006.01)
  *B60N 2/20* (2006.01)
  *B60N 2/36* (2006.01)

(56) References Cited

U.S. PATENT DOCUMENTS

| | | | | |
|---|---|---|---|---|
| 5,795,023 A | * | 8/1998 | Kayumi | B60N 2/3013 296/69 |
| 5,913,570 A | * | 6/1999 | Yoshida | B60N 2/3013 296/65.09 |
| 6,155,639 A | * | 12/2000 | Frolo | B60N 2/36 296/65.03 |
| 6,203,104 B1 | * | 3/2001 | Matsuo | B60N 2/3013 297/188.1 |
| 6,679,536 B1 | * | 1/2004 | Sonnenberg | B60N 2/3011 296/65.09 |
| 6,736,456 B2 | * | 5/2004 | Okamoto | B60N 2/2809 297/254 |
| 2005/0236879 A1 | | 10/2005 | Kim | |

FOREIGN PATENT DOCUMENTS

| | | |
|---|---|---|
| JP | 2005-313867 A | 11/2005 |
| JP | 2010-269622 A | 12/2010 |

\* cited by examiner

DOUBLE-FOLDING-TYPE AUTOMOTIVE SEAT WITH HEADREST

TECHNICAL FIELD

The present invention relates to a double-folding-type seat for use in an automobile, which includes: a seat cushion having a forward end portion rotatably mounted on a floor of the automobile; and a seat back having a lower end portion rotatably mounted on that floor of the automobile, so that both seat cushion and seat back can be respectively folded to their non-use positions. In particular, the invention is directed to a double-folding-type automotive seat of this kind which has a headrest detachably provided on a top of the seat back.

BACKGROUND ART

Among the above-stated sorts of double-folding-type automotive seats, by way of one example, known is a double-folding-type automotive seat with a headrest, which is described in the Laid-Open Patent Publication No. 2010-269622 (Patent-related document 1). This prior-art seat includes: a seat cushion having a forward end portion rotatably mounted on a floor of the automobile; a seat back having a lower end portion rotatably mounted on that floor of the automobile; and a headrest detachably attached to a top of the seat back. When the seat is in normal use for when a seat occupant sits on the seat), the seat back extends upright from a floor of automobile, whereas the seat cushion is set in a horizontally extending state above the floor of automobile. The steps of folding a whole of that seat consist of: rotatively folding the seat cushion upwardly and forwardly relative to the forward end portion thereof to an upright non-use position; then removing the headrest from the top of the seat back, and thereafter, rotatively folding the seat back downwardly and setting the same in a non-use position where it extends horizontally above the floor of automobile. In such double-folded state of the seat, a wide space is given over the folded seat back and can be used as a loading area where baggages can be stored.

According to this conventional seat, during the steps of folding the seat, if the seat back with the headrest attached thereto is folded downwardly, the headrest is inevitably brought to contact with the seat cushion, which makes it hard for a user to smoothly fold the seat back to the non-use position. Thus, to avoid such contact of headrest with the seat cushion, the user first removes the headrest before folding the seat back, and then, after having folded the seat back to the non-use position, he or she places the headrest on a surface of the folded seat back.

PRIOR-ART LITERATURE

Patent-Related Document

Patent-Related Document 1: Japanese Laid-Open Patent Publication No. 2010-269622

SUMMARY OF THE INVENTION

Problems to be Solved by the Present Invention

As stated above, in the prior art, after having removed the headrest from the seat back, the headrest is placed on a surface of the seat back that has been folded to the non-use position. Consequently, a space for storing baggages, which is given over the folded seat back, is reduced or narrowed by the headrest. Further, before unfolding and returning those folded seat cushion and seat back to their respective use positions, a user is compelled to find the headrest in the baggage space given over the folded seat back, for which reason, it is better to arrange the seat such that the headrest can be positioned at a viewable point where the headrest will readily be viewed and recognized by the user, for improvement of usability.

It is a purpose of the present invention to provide a double-folding-type automotive seat with a headrest, which is simplified in structure and permits easy change in position of the headrest when folding and unfolding the seat.

Means for Solving the Problem

In order to solve the above-stated problems, according to the present, there is provide a double-folding-type seat with a headrest, which is adapted for use with an automobile, the double-folding-type seat with the headrest including: a seat cushion having a forward end portion rotatably mounted on a floor of the automobile and an engagement piece provided to a rear end portion of the seat cushion, the engagement piece being normally disposed near to the floor of the automobile and displaceable with the seat cushion, wherein the seat cushion is rotatable forwardly from a horizontal use position thereof toward an upright position thereof; a seat back having a lower end portion rotatably mounted on the floor of the automobile, the seat back being rotatable forwardly from an upright use position thereof toward a horizontal position thereof; and the headrest which is detachably mounted on a top of the seat back, the double-folding-type seat with the headrest being characterized by including a headrest attaching portion provided to a bottom surface of the headrest, the headrest attaching portion being so configured to permit insertion therein of the engagement piece of the seat cushion.

Accordingly, in the above-constructed double-folding-type automotive seat, the headrest attaching portion, in which the engagement piece of the seat cushion can be inserted, is provided to the bottom surface of the headrest. Thus, when having removed the headrest from the top of the seat back and have folded both seat cushion and seat back to the upright and horizontal positions, respectively, a user can attach the headrest on the folded seat cushion by inserting the engagement piece of the seat cushion in the headrest attaching portion of the headrest, which realizes easy change in position of the headrest. Further, provision of the headrest attaching portion in which the engagement piece can be inserted is effective in simplifying the structure of the seat and also permits easy attaching of the headrest on the folded seat cushion. This eliminates the necessity for a user to position the headrest in the baggage space given over the folded seat back, so that such baggage space can be fully used without hindrance of the headrest.

The aforesaid headrest attaching portion may be formed with a hole portion as a part thereof, the hole portion being configured to permit insertion therein of the engagement piece of the seat cushion. In that mode, by simply inserting the engagement piece in such hole portion defined in the headrest, a user can easily attach the headrest on the folded seat cushion.

Also, a hook piece with which the engagement piece of the seat cushion can be engaged may be provided in the aforesaid hole portion formed in the headrest attaching portion. With this provision of hook piece, the engagement piece of the headrest can be engaged with the hook piece, so that the headrest may be positively attached and retained on the folded seat cushion.

In the present invention, where the headrest has a pair of stays extending from the bottom surface of the headrest, the headrest attaching portion may be situated between the pair of stays at the bottom surface of the headrest. In that mode, a special other storage portion where those two stays can be stored is not required in both of the seat cushion and seat back. The headrest attaching portion is simple in structure and permits insertion therein of the engagement piece of the seat cushion, while also avoiding contact of the two stays of the headrest with the seat cushion when the headrest is attached on the seat cushion.

Also, even if the headrest includes a pair of stays extending from the bottom surface of the headrest as stated above, the headrest attaching portion may be situated between the pair of stays at the bottom surface of the headrest, with arrangement of the headrest attaching portion being such that, when the seat back and the seat cushion have been rotated to the upright position of the seat back and the horizontal position of the seat cushion, respectively, and then the engagement piece of the seat cushion is inserted in the headrest attaching portion, a user can attach the headrest on the folded seat cushion set at the upright position, with the pair of stays of the headrest being positioned in such a manner as to extend away from the seat cushion and face to a side where the folded seat cushion set at the horizontal position exists. Thus, both two stays of the headrest merely project short towards the rear surface of the folded seat back, which in effect widens a baggage storage space on and above that rear surface of the seat back.

The headrest attaching portion may be formed in shape of a slit. In that mode, when the engagement piece of the seat cushion is forcibly inserted into such slit-like headrest attaching portion and a hole portion thereof, a resilient repulsive force of the padding is acted on and about headrest attaching portion, which attempts to close that hole portion and bias the headrest attaching portion into contact with the engagement piece of the seat cushion, so that the headrest is positively retained at the headrest attaching portion against removal from the seat cushion.

The aforesaid hook piece may include a hooked engagement portion formed in an upper portion thereof, and the hook piece be attached on and along an inner surface of the aforesaid hole portion forming a part of the headrest attaching portion. In that mode, the engagement piece of the seat cushion can be smoothly inserted in the headrest attaching portion, while being in smooth sliding contact with an inner surface of the hole portion, and then, the engagement piece be hookingly engaged with the hooked engagement portion situated in the upper inner region of the hole. Thus, due to such hooking engagement of the engagement piece of the seat cushion with the hooked engagement portion, the headrest is positively attached and retained on the folded seat cushion.

The aforesaid hooked engagement portion of the hook piece may be of such a curved configuration that permits the engagement piece of the seat cushion to be engaged therewith and disengaged therefrom. This mode facilitates the ease of engagement of the engagement piece of the seat cushion with the hooked engagement portion of the hook piece.

Also, such hooked engagement portion of the hook piece may, at a distal end thereof, be formed with a snag part adapted for allowing the engagement piece of the seat cushion to be snagged thereon. This mode insures a positive engagement and connection of the engagement piece of the seat cushion with the hook piece.

The aforesaid engagement piece may comprise: a pair of longitudinally extending portions projected from a rear surface portion of the seat cushion; and a connecting portion integrally extended between the pair of longitudinally extending portions. In that mode, when the engagement piece of the seat cushion is inserted and placed in the headrest attaching portion, both two longitudinally extending portions of the engagement piece closely contact an inner surface of the headrest attaching portion, thereby preventing the headrest from being moved and dislocated in horizontal direction on the folded seat cushion.

Effects of the Invention

Therefore, the present invention provides an improved double-folding-type automotive seat with a headrest, which has a quite simplified structure and permits easy change in position of the headrest when folding and unfolding the seat.

MODE FOR CARRYING OUT THE INVENTION

With reference to FIGS. 1 to 6, a description will be made of one exemplary mode of the present invention.

Figure 1:
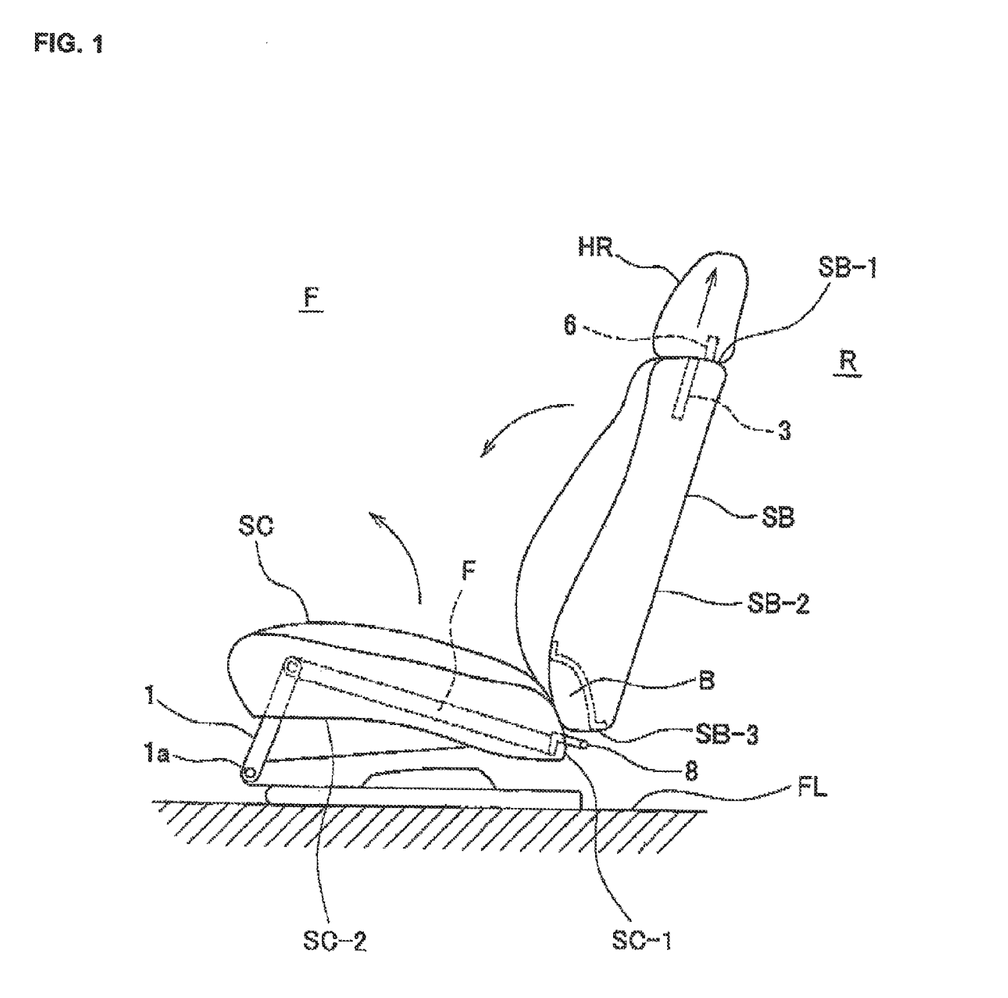
[FIG. 1]: A side view of a double-folding-type automotive seat with a headrest in accordance with one exemplary mode of the present invention, which shows a normal use state of that seat.
Figure 2:
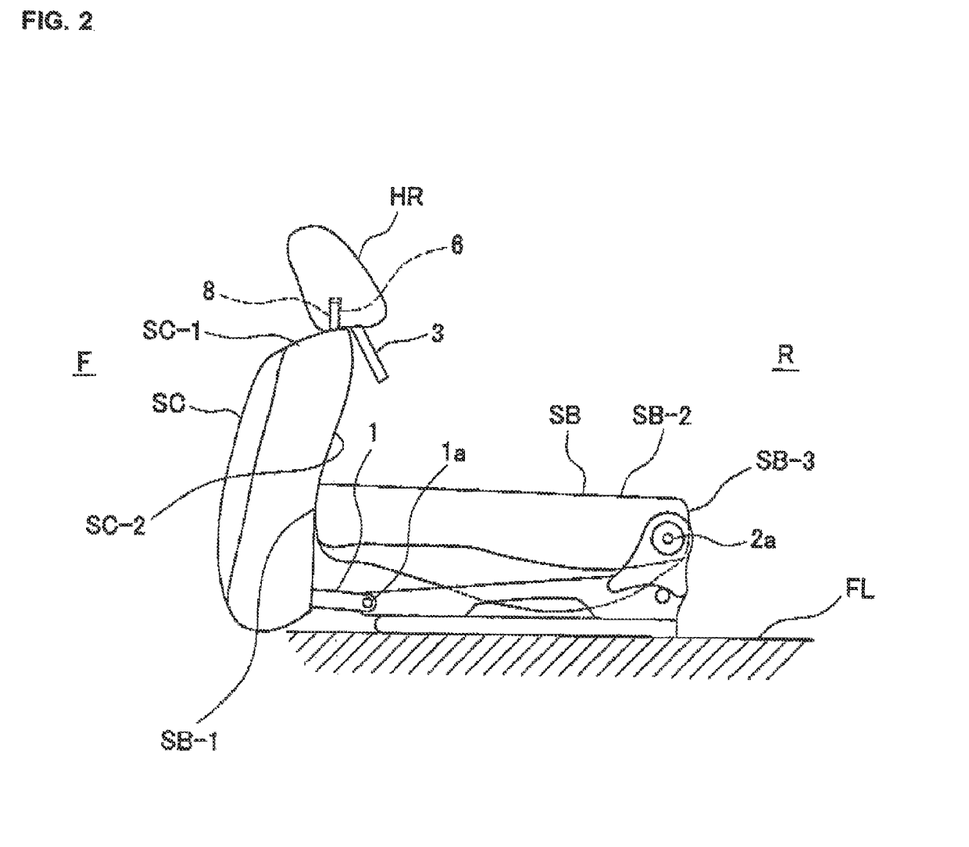
[FIG. 2]: A side view showing a completely folded state of the double-folding-type automotive seat with the headrest shown in the FIG. 1.

FIG. 1 shows a normal use state of a double-folding-type seat provided with a headrest in accordance with the present invention, such seat being adapted for use in an automobile. FIG. 2 shows a folded state of that automotive seat. A seat cushion SC of this seat includes a link element 1 provided to a forward end portion thereof, and a lower end 1a of that link element 1 is rotatably connected to a floor FL associated with the automobile. Also, the seat cushion SC includes an engagement piece 8 provided to a rearward end portion SC-1 thereof, wherein the engagement piece is normally disposed near to the automobile floor FL. The engagement piece 8 is fixed to a mid point of a cross frame portion of an internal frame F which is provided in the seat cushion as one part constituting the seat cushion. In this regard, a recessed region B is formed in a seat back SB of the seat in a shape substantially conforming to a path or locus along which the engagement piece 8 is to be displaced when the seat cushion SC is folded and unfolded, so that, when folding the seat cushion SC forwardly for instance, the engagement piece 8 provided thereto is moved in and through the recessed region, thereby avoiding contact of the engagement piece 8 with the lower end of the seat back SB and permitting smooth forward-and-upward rotation of the seat cushion SC.

On the other hand, the seat back SB is, at a lower end portion SB-3 thereof, rotatably connected with a device 2 provided to a side of the automobile floor FL, the seat back SB also including a headrest HR detachably mounted on a top portion SB-1 of the seat back SB. The headrest HR has a pair of stays 3 and 3 extending outwardly from a bottom surface HR-3 (see FIG. 3) thereof. Those two stays 3 and 3 are respectively inserted and secured in two securing holes (not shown) that are formed in the top portion SB-1 of the seat back SB.

As constructed above, as shown in FIG. 1, when the seat is in a normal use, the seat cushion SC is set in a use position where it extends horizontally above the automobile floor FL, whereas the seat back SB stands upright, extending vertically from the automobile floor FL. When folding a whole of the seat from such normal use state to a double folded state shown in FIG. 2, the seat cushion SC is first rotated relative to the lower end 1a of the link element 1 in the direction of arrow to a forward side F, as seen in FIG. 1. At this point, as stated above, the recessed region B is formed in the seat back SB in a shape substantially conforming to a path or locus along which the engagement piece 8 is to be displaced when the seat cushion SC is folded and unfolded. Therefore, the seat cushion SC is smoothly rotated upwards in the arrow direction to the forward side F, with the engagement piece 8 provided thereto being neither contacted with nor caught by the lower end of the seat back SC.

After then, the headrest HR is removed from the top of the seat back SB (in an upward direction of arrow indicated in FIG. 1), and, as indicated in FIG. 2, the seat back SB is folded downwardly to the forward side F and set in the use position where the seat back extends horizontally above the automobile floor FL. Thus, a wide space is given on and above the rear surface SB-2 of the folded seat back SB, so that the space can be used as a baggage storage area. Under the thus-folded state of the seat, as shown in FIG. 2, the headrest HR is attached to the aforesaid engagement piece 8 provided to the rear end portion SC-1 of the seat cushion SC.

Accordingly, it is to be appreciated that, after a user has folded the seat cushion SC upwards to the forward side F and set it at an upright position where the seat cushion extends vertically as shown in FIG. 2, the engagement piece B is then positioned atop such vertically extending seat cushion SC, so that the engagement piece B itself directly comes into view and can be quickly seen by the user. Hence, it is possible for the user to easily recognize that engagement piece as a position for attaching the headrest HR to the seat cushion SC, as will be described later.

Figure 3:
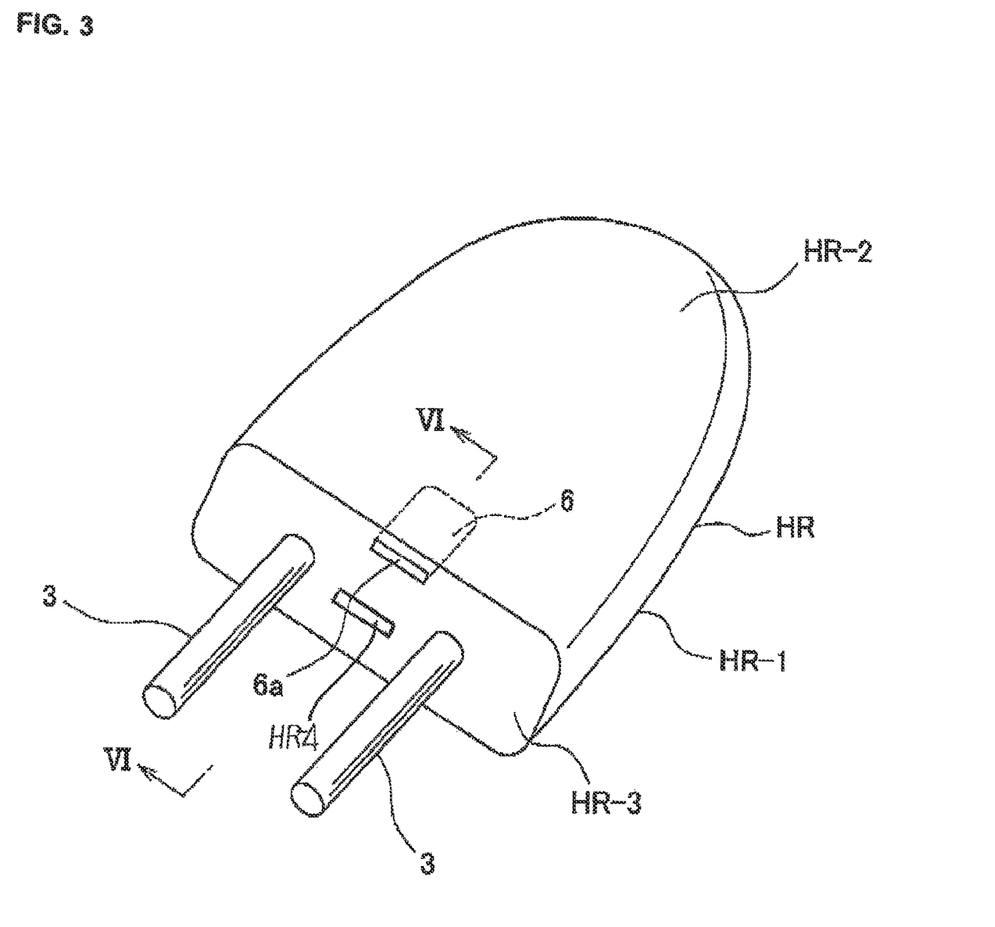
[FIG. 3]: A perspective view of the headrest shown in the FIG. 1.

As shown in FIG. 3, the headrest HR is mounted on the seat back SB that is set in a use position, prior to its being folded. Under that state, the headrest HR is shown as having: a first surface HR-1 which forms a front surface adapted for receiving a head portion of a seat occupant; and a second surface HR-2 which forms a rear surface opposite to the first surface. Designation HR-3 denotes a bottom surface of the headrest HR. Provided to such bottom surface HR-3 are: a pair of stays 3 and 3; and an headrest attaching portion 6. As seen in FIG. 3, the headrest attaching portion 6 is situated between the pair of stays 3 and 3 as well as near to the second surface HR-2.

Figure 4:
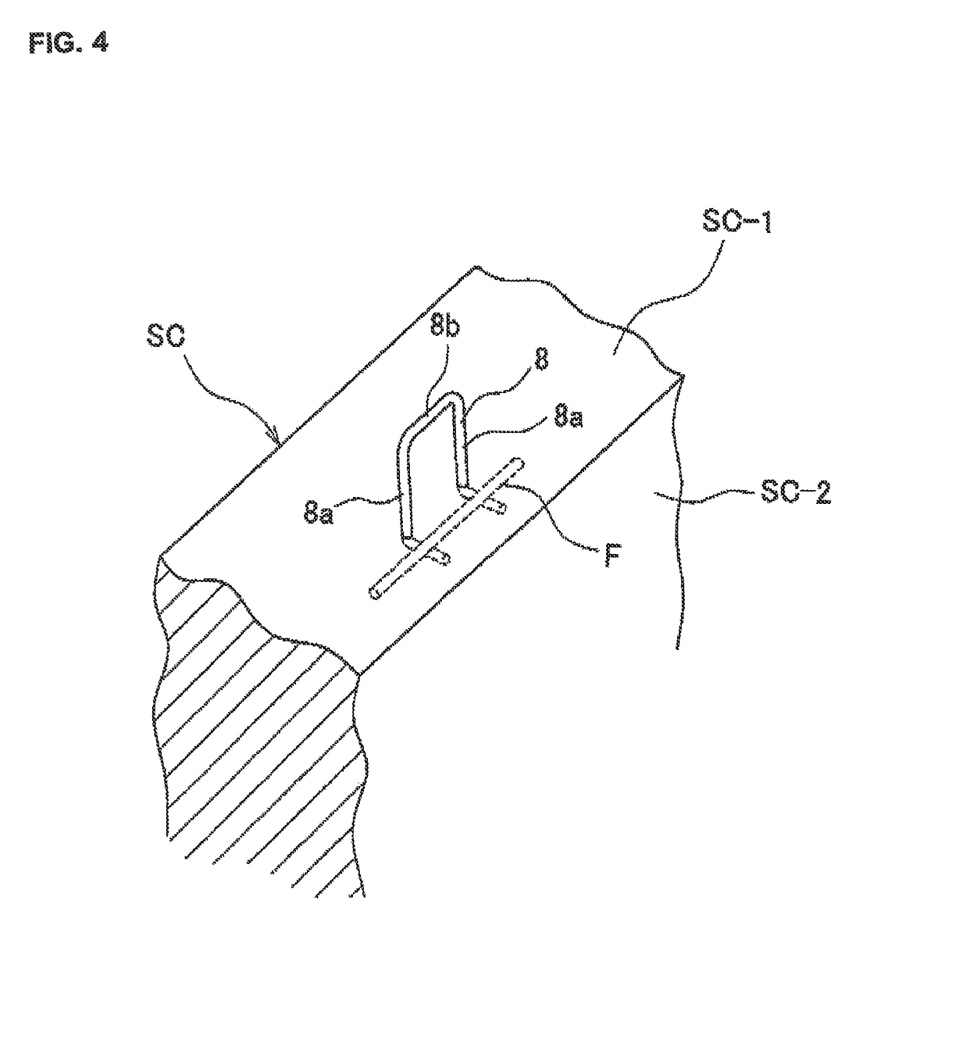
[FIG. 4]: A partly-broken perspective view showing a rearward portion of a seat cushion of the seat shown in the FIG. 2.

As shown in FIG. 4, the engagement piece 8 of the seat cushion SC is formed by: a pair of longitudinally-extending rod portions 8a and 8a that project from a rear surface or rear end portion SC-1 of the seat cushion SC toward a rear side of the seat where the seat back SB exists; and a connecting rod portion 8b extended and connected between two distal ends respective of those two longitudinally-extending portions 8a and 8a. This engagement piece 8 is of such a configuration that can be bodily inserted in the aforesaid headrest attaching portion 6 of the headrest HR, wherein that headrest attaching portion 6 assumes a shape of hole and is formed in the bottom surface HR-3 of the headrest HR as illustrated. Accordingly, the engagement piece 8 of the seat cushion SC may be inserted into an opening 6a of the headrest attaching portion 6 and fit in the inside of that particular headrest attaching portion 6, so that the headrest HR may be temporarily attached upon the seat cushion SC, as shown in FIG. 2.

As can be seen in FIGS. 1 and 4, disposition of the engagement piece 8 at the seat cushion's rear portion SC-1 is such that the engagement piece itself is normally positioned below and adjacent to the seat back's bottom surface SB-3, when the seat is set in the shown use position. Owing to such arrangement of the engagement piece, when folding the seat cushion and seat back to the folded state shown in FIG. 2, a user can remove the headrest HR from the seat cushion and attach the same upon the seat back by inserting the engagement piece 8 into the aforesaid headrest attaching portion 6 of the headrest HR. Upon the headrest HR having been attached as such, both two stays 3 and 3 thereof are positioned so as to extend away from the rear portion SC-1 of the upright-folded seat cushion, while facing to the horizontally-extending seat back SB on the rear side R. Therefore, the bottom surface HR-3 of the headrest HR is sufficiently contacted on the seat cushion's rear portion SC-1, whereby the headrest HR per as is stably attached on the folded seat cushion SC standing upright.

As stated above, the engagement piece 8 of the seat cushion SC is formed by: the two longitudinally-extending rod portions 8a and 8a that projects from the rear end portion SC-1 of the seat cushion SC toward the side where the seat back SB exists; and the connecting rod portion 8b extended between the two rod portions 8a and 8a. This engagement piece 8 is configured such that, when the engagement piece 8 is inserted into the headrest attaching portion 6 through the opening 6a of the latter, substantially a whole of the two longitudinally-extending rod portions 8a and 8a of the engagement piece 8 is fitted in the headrest attaching portion 6 in close contact therewith, thereby preventing any undesired movement or dislocation of the headrest HR in horizontal or lateral direction on the upright-folded seat cushion.

Figure 5:
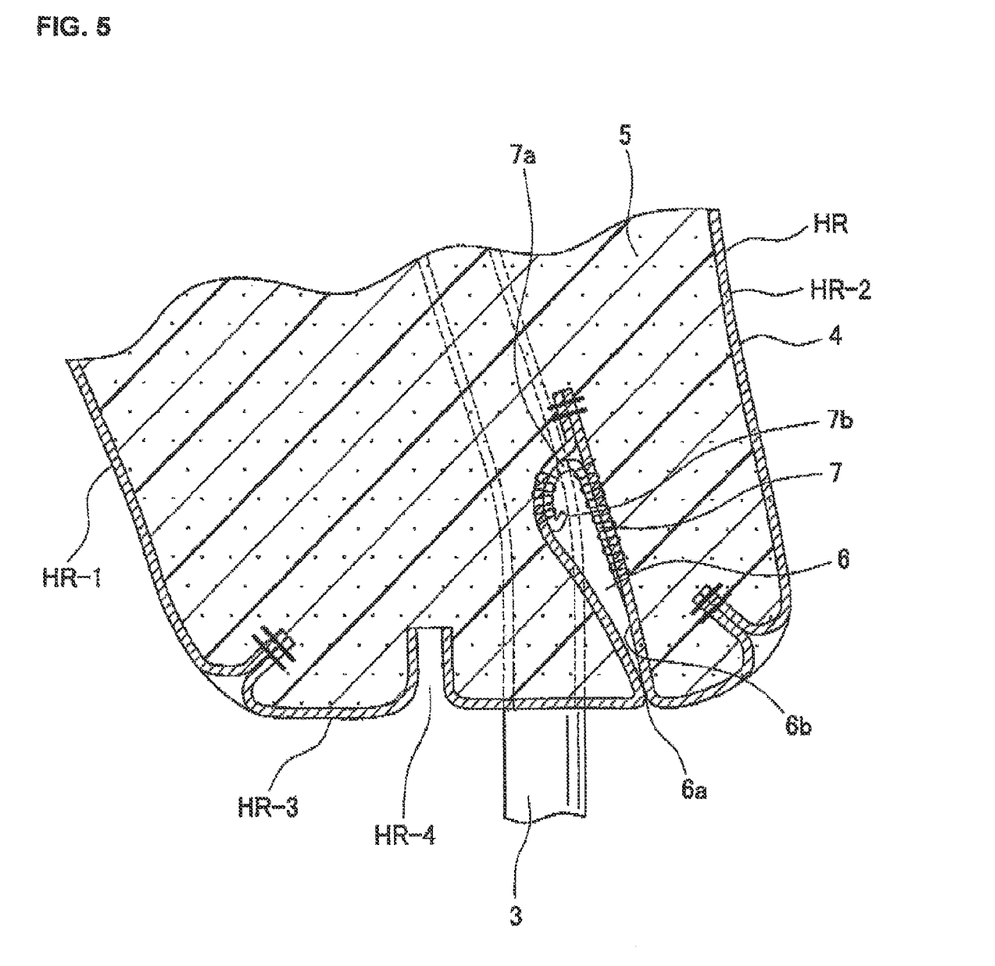
[FIG. 5]: A sectional view taken along the line VI-VI with regard to the headrest shown in the FIG. 3.

It is noted that a shape of the opening 6a of the headrest attaching portion 6 and an entire shape of the inside of the headrest attaching portion 6 associated with the headrest HR is of such a configuration that permits substantially an entirety of the engagement piece 8 to be inserted in those opening and inside of the attaching portion. For example, both opening and inside of the headrest attaching portion may be formed in shape of a slit. Suppose now that the headrest attaching portion and the opening thereof are formed like a slit as indicated in FIG. 5. In that mode, when the engagement piece 8 of the seat cushion SC is forcibly inserted into the slit-like attaching portion through the opening 6a, a resilient repulsive force of the padding 5 is acted on and about the opening 6a and headrest attaching portion, which attempts to close that opening and bias the headrest attaching portion into contact with the engagement piece 8 of the seat cushion SC, so that the headrest is positively retained at the headrest attaching portion thereof against removal from the seat cushion.

In this context, formation of the headrest HR is effected through the steps of: placing the two stays 3 and 3 within the three-dimensional bag-like trim cover assembly 4; providing a U-shaped frame (not shown) having two leg portions; inserting one of the two leg portions of that U-shaped frame in an opening formed in the trim cover assembly, the opening corresponding to the aforesaid headrest attaching portion 6, while inserting the other of the two leg portions of the U-shaped frame in a hole HR4 situated behind the headrest attaching portion (see FIG. 3); injecting a liquid foaming agent in the inside of the trim cover assembly; and curing the liquid foaming agent to create the padding 5 together with the stays and U-shaped frame in an integral manner. After completion of this foaming process, the U-shaped frame is removed from the resulting headrest, whereupon a hole is formed in the padding at a location corresponding to the headrest attaching portion 6, and it is therefore seen that such hole constitutes the headrest attaching portion 6. In other words, a hole-like configuration of headrest attaching portion 6 is formed in the bottom surface HR-3 of the headrest HR.

The above-described process features use of the U-shaped frame and involves inserting one leg portion of the U-shaped frame in an opening formed in the trim cover assembly, the opening corresponding to the headrest attaching portion 6, and inserting the other leg portion of the U-shaped frame in a hole HR4 situated behind the headrest attaching portion, followed by the steps of injecting and curing the liquid foaming agent within the trim cover assembly, so that a resulting headrest HR is formed. With those steps, a hole is simply formed in the padding at the point where the aforesaid U-shaped frame's one leg portion is inserted. In other words, a hole configuration of headrest attaching portion 6 having a hole region therein can be easily formed in the bottom surface HR-3 of the headrest HR.

Figure 6:
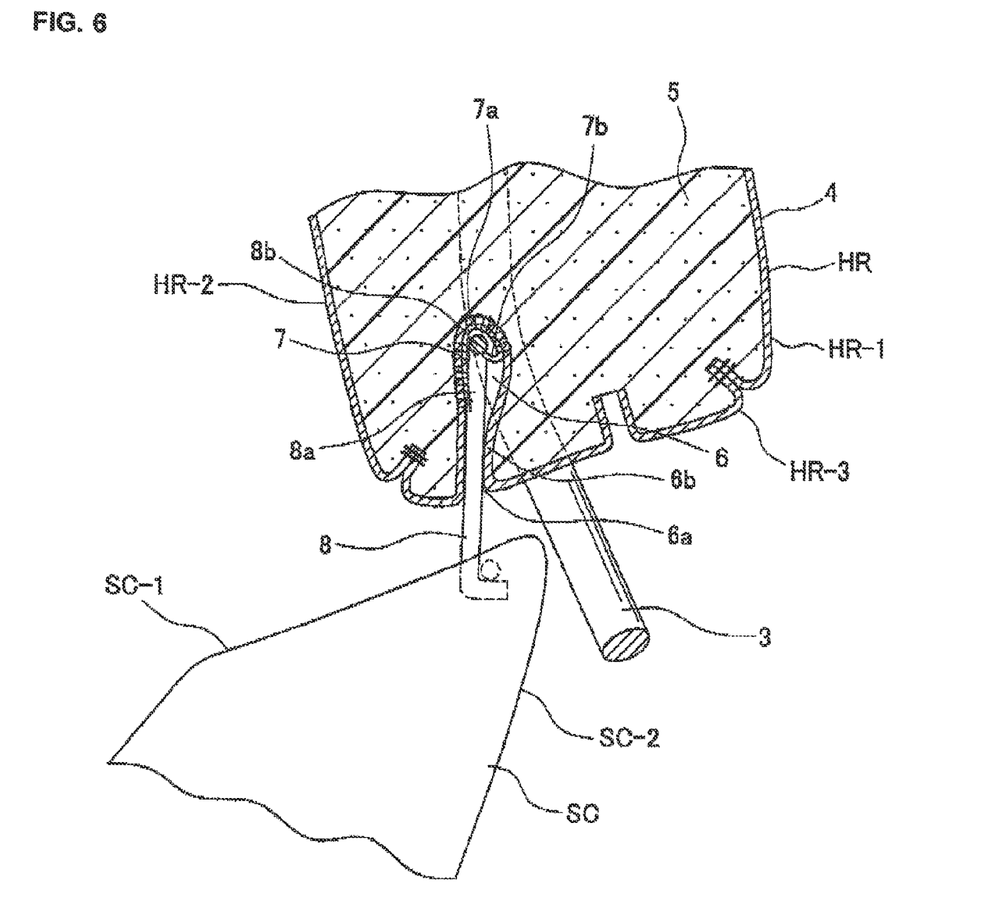
[FIG. 6]: A fragmentary sectional view showing a state where the headrest is attached on the seat cushion of the seat shown in FIG. 2.

As described above, the headrest attaching portion 6 has a configuration of hole, and the engagement piece 8 of the seat cushion SC may be inserted in that hole-like headrest attaching portion 6 to thereby attach the headrest HR on the folded seat cushion SC. Optionally, as shown in FIGS. 5 and 6, a hook piece 7 may be provided within such headrest attaching portion 6. The hook piece 7 is depicted in the FIGS. 5 and 6 as being fixedly connected by sewing to an inner surface 6a of the hole region of the headrest attaching portion 6. With this sewing connection, the hook piece 7 is prevented from being removed downwards from the inside of the hole region of the headrest attaching portion 6. Also, due to the sewing connection, the hook piece 7 is not dislocated even when it is pulled by a force or contact given thereto, hence preventing a forced outward removal of the hook piece from the headrest attaching portion. In that way, firm fixation of the hook piece 7 to the inside of the hole region of the headrest attaching portion 6 is realized. Note that this hook piece 7 may be formed from a proper resin material, for example.

In the present mode employing the hook piece 7, as can be seen in FIG. 6, the engagement piece 8 of the seat cushion SC, upon its being inserted in the headrest attaching portion 6, is engaged over the hook piece 7 and securely connected thereto, whereby the headrest HR is reliably attached on the folded seat cushion and retained against removal therefrom.

The steps of securing the aforesaid hook piece 7 in the attaching portion 6 will be described. Prior to forming the headrest, the hook piece 7 is first inserted in the hole region of the headrest attaching portion 6 formed in the trim cover assembly, and then, the previously-mentioned U-shaped frame is used. Namely, one leg portion of the U-shaped frame is inserted in that hole region where the hook piece has been inserted, followed by the same steps described above for that U-shaped frame. Thereafter, a liquid foaming agent is injected in the inside of the trim cover assembly and cured to create a foam padding filled in the trim cover assembly, thereby securing the hook piece 7 in the hole region of the headrest attaching portion 6.

Such process of securing the hook piece 7 features: inserting the hook piece 7 in the hole region of the headrest attaching portion 6; then inserting one leg portion of the U-shaped frame in the hole region where the hook piece has been inserted; thereafter injecting a liquid foaming agent in the trim cover assembly and curing the liquid foaming agent to create a foam padding therein, which therefore makes it easy to securely place the hook piece 7 in the hole region of the headrest attaching portion. Further, after the hook piece 7 has been secured in the headrest attaching portion 6 as such, the opening 6a of the headrest attaching portion is caused by a resilient pressing force of the padding 5 to close, and also such resilient pressing force acts on the hook piece 7, whereby the hook piece itself is securely retained in the headrest attaching portion 6.

With regard to the hook piece 7, as shown in FIGS. 5 and 6, a flat body portion thereof is attached to and along an inner surface 6b of the headrest attaching portion 6 formed in the aforesaid headrest, whereas a hooked engagement portion 7a, formed in an upper end region of the hook piece, is situated in an upper inner area of the headrest attaching portion. Accordingly, when inserting the engagement piece 8 of the seat cushion SC in the hole-like headrest attaching portion 6, the engagement piece 8 is smoothly inserted therein, while being in a smooth sliding contact on and along the inner surface 6b of the headrest attaching portion 6 as well as along the flat body portion of the hook piece, with the result that the connecting rod portion 8b of the engagement piece 8 is hookingly connected with the hooked engagement portion 7a situated in the upper inner region of the headrest attaching portion 6. With this arrangement, the headrest can be assuredly attached and retained on the seat cushion.

The hooked engagement portion 7a of the hook piece 7 is of such a curved configuration that permits the engagement piece 8 of the seat cushion SC to be engaged therewith and disengaged therefrom. Due to this curved configuration, the engagement piece 8 of the seat cushion SC can be easily entered into the hooked engagement portion 7a and hookingly connected therewith.

Further, the hooked engagement portion 7a of the hook piece 7 is, at its distal end portion, formed with a snag part 7b adapted for allowing the connecting rod portion 8b of the engagement piece 8 of the seat cushion SC to be snagged thereon or anchoringly connected therewith. This arrangement reliably insures engagement and connection of the engagement piece 8 of the seat cushion SC with the hook piece.

When it is desired to return the folded state of the seat shown in FIG. 2 to the normal use state of the seat shown in FIG. 1, a user should first draw the headrest HR upwards from the seat cushion. Namely, when the headrest is drawn upwards by the user from the seat cushion, the connecting rod portion 8b of the engagement piece 8 is disengaged from the hook piece 7, thereby permitting the headrest HR to be removed from the seat cushion. After having removed the headrest form the seat cushion, the user unfolds the seat back SB upwards in a reverse direction opposite to the arrow direction given in FIG. 1 and sets the seat back at the upright use position, after which, he or she unfolds the seat cushion SC upwards in a reverse direction to the arrow direction given in FIG. 1 and sets the seat cushion in the horizontal use position. In that way, the seat is set in a normal use condition shown in FIG. 2. Subsequently, the two stays 3 and 3 of the headrest HR are respectively inserted in two stay insertion holes (not shown) formed in the top of the seat back SB, whereupon the headrest HR is mounted on the top portion SB-1 of the seat back SB as shown in FIG. 1, thereby placing a whole of seat and headrest in a normal use condition.

DESCRIPTION OF THE REFERENCE NUMERAL

SB denotes a seat back
SC denotes a seat cushion
HR denotes a headrest 6 denotes a headrest attaching portion
7 denotes a hook piece
8 denotes an engagement piece of the seat cushion

The invention claimed is:

1. A double-folding-type seat for an automobile, comprising:
   a headrest;
   a seat cushion having a forward end portion configured to be rotatably mounted on a floor of the automobile such that said seat cushion rotates from a horizontal use position to an upright position by rotating said seat cushion in a forward direction, said seat cushion having an engagement piece provided to a rear end portion of the seat cushion such that said engagement piece is at a position adjacent said floor when said seat cushion is in the horizontal position, and at a position away from said floor when said seat cushion is in the upright position; and
   a seat back having a lower end portion configured to be rotatably mounted on said floor such that said seat back rotates from an upright use position to a horizontal position by rotating the seat back in the forward direction, and said headrest being detachably mounted on a top of said seat back when the seat back is in the upright use position,
   wherein said headrest includes:
      a stay, extending from a bottom of said headrest, for attaching said headrest to an upper end of said seat back when said seat back is in said upright use position, and
      a headrest attaching portion provided at a bottom surface of said headrest, said headrest attaching portion being so configured to permit insertion therein of said engagement piece of said seat cushion when said back is in said horizontal position.

2. A double-folding-type seat with the headrest as described in claim 1, wherein said engagement piece comprises: a pair of longitudinally extending portions projected from a rear surface portion of said seat cushion; and a connecting portion integrally extended between said pair of longitudinally extending portions.

3. A double-folding-type seat with the headrest as described in claim 1, wherein said headrest attaching portion is formed in shape of a slit.

4. A double-folding-type seat with the headrest as described in claim 1, wherein said headrest includes a pair of stays extending from said bottom surface of the headrest, and wherein said headrest attaching portion is situated between said pair of stays at said bottom surface of the headrest.

5. A double-folding-type seat with the headrest as described in claim 1,
   wherein said headrest includes a pair of stays extending from said bottom surface of the headrest, and said headrest attaching portion is situated between said pair of stays at said bottom surface of the headrest,
   wherein said headrest is attached to said seat back by said pair of stays when said seat back and said seat cushion have been rotated to said upright use position and said horizontal use position, respectively, and
   wherein said headrest is attached to said seat cushion by inserting said engagement piece in said headrest attaching portion, when said seat cushion is in said upright position and said seat back is in said horizontal position, with said pair of stays extending away from said seat cushion and towards said seat back in said horizontal position.

6. A double-folding-type seat with the headrest as described in claim 1, wherein said headrest attaching portion is formed with a hole portion as a part thereof, said hole portion being configured to permit insertion therein of said engagement piece of said seat cushion.

7. A double-folding-type seat with the headrest as described in claim 6, wherein a hook piece, which is engageable with said engagement piece of said seat cushion, is provided in said hole portion forming the part of said headrest attaching portion.

8. A double-folding-type seat with the headrest as described in claim 7, wherein said hook piece includes a hooked engagement portion formed in an upper portion thereof, and wherein said hook piece is attached on and along an inner surface of said hole portion forming the part of said headrest attaching portion.

9. A double-folding-type seat with the headrest as described in claim 7, wherein said hooked engagement portion of said hook piece is of such a curved configuration that permits said engagement piece of said seat cushion to be engaged therewith and disengaged therefrom.

10. A double-folding-type seat with the headrest as described in claim 9, wherein said hooked engagement portion of said hook piece is, at a distal end thereof, formed with a snag part adapted for allowing said engagement piece of said seat cushion to be snagged thereon.

* * * * *